United States Patent [19]
Norimatsu et al.

[11] Patent Number: 5,207,780
[45] Date of Patent: May 4, 1993

[54] HYDRAULIC VALVE DEVICE FOR AUTOMOTIVE POWER STEERING GEAR

[75] Inventors: Naoki Norimatsu; Naoki Yuzuriha; Koh Uchida, all of Kanagawa, Japan

[73] Assignee: Nissan Motor Co., Ltd., Yokohama City, Japan

[21] Appl. No.: 709,833

[22] Filed: Jun. 4, 1991

[30] Foreign Application Priority Data

Jul. 4, 1990 [JP] Japan .................................. 2-176899

[51] Int. Cl.⁵ .......................................... B62D 5/083
[52] U.S. Cl. .................................... 180/141; 180/149;
60/384; 137/625.21
[58] Field of Search ............... 180/132, 141, 142, 149;
60/384; 91/375 A; 137/625.21, 625.22

[56] References Cited

U.S. PATENT DOCUMENTS

| | | | |
|---|---|---|---|
| 4,122,866 | 10/1978 | Schluckebier | 91/375 A X |
| 4,573,496 | 3/1986 | Richard | 91/375 A X |
| 4,633,907 | 1/1987 | Adams | 91/375 A X |
| 4,860,846 | 8/1989 | Uchida et al. | 180/141 |
| 5,048,628 | 9/1991 | Rayner | 180/141 |
| 5,097,920 | 3/1992 | Holm Pederson et al. | 180/132 |

FOREIGN PATENT DOCUMENTS 0205559  9/1986  Japan .................................. 180/141

OTHER PUBLICATIONS

Nissan's Service Manual published in 1981 and translation of p. 29.

*Primary Examiner*—Margaret A. Focarino
*Assistant Examiner*—Carla Mattix
*Attorney, Agent, or Firm*—Foley & Lardner

[57] ABSTRACT

A power steering device for a motor vehicle whereby when the vehicle is under a high or middle speed movement, the slide torque is controlled to a relatively low constant level irrespective of the turning of the steering wheel. The device includes a hydraulic pump for producing a hydraulic pressure; a power cylinder powered by the hydraulic pressure for producing a force to assist the steering job; a hydraulic valve for controlling the hydraulic pressure supplied to the power cylinder, the hydraulic valve including a valve shaft and a valve body; a chattering protection seal associated with the hydraulic valve to assure a concentric rotation of the valve shaft relative to the valve body with an assistance of hydraulic pressure applied thereto; and an electronically controlled solenoid valve. The electronically controlled solenoid valve applies when the vehicle is at a standstill or under a low speed movement, the chattering protection seal with a hydraulic pressure which is varied as a steering wheel is turned, and applies, when the vehicle is under a high or middle speed movement, the chattering protection seal with a hydraulic pressure which is controlled to a relatively low constant level even when the steering wheel is turned.

17 Claims, 7 Drawing Sheets

HYDRAULIC VALVE DEVICE FOR AUTOMOTIVE POWER STEERING GEAR

BACKGROUND OF THE INVENTION

1. Field of the Invention

The present invention relates in general to an automotive power steering gear, and more particularly to a hydraulic valve device of an automotive power steering gear.

2. Description of the Prior Art

In order to control feeding of hydraulic fluid to a power cylinder, a hydraulic valve device is connected to a power steering gear.

For clarification of the task of the present invention, one conventional hydraulic valve device will be described with reference to FIGS. 6, 7 and 8 of the accompanying drawings.

FIG. 6 shows a hydraulic circuit of an essential part of the conventional hydraulic valve device.

In the drawing, denoted by numeral 6 is a hydraulic pump, and denoted by numeral 7 is a reservoir tank. Denoted by numeral 10 is a fluid line which extends from the hydraulic pump 6 to a branch point D1 from which two fluid lines 10a and 10b extend. These two fluid lines 10a and 10b are mated at a junction point D2 from which a fluid return line (no numeral) extends to the reservoir tank 7.

The fluid line 10a has two variable apertures 1R and 2L mounted thereto, and the other fluid line 10b has two variable apertures 1L and 2R mounted thereto. These variable apertures 1R, 2R, 1L and 2L are formed in an after-mentioned hydraulic valve 41 installed in the steering gear.

A power cylinder 5 is incorporated with the two fluid lines 10a and 10b, which has one I/O opening connected to an intermediate point between the variable apertures 1R and 2L and the other I/O opening connected to an intermediate point between the variable aperatures 1L and 2R.

With turning of the steering wheel to the right, the variable apertures 1R and 2R decrease their opening depending on the steering torque. While, with turning of the steering wheel to the left, the other variable apertures 1L and 2L decrease their opening depending on the steering torque.

Although not shown in the drawing, a solenoid valve controlled by a control unit is employed to vary the hydraulic pressure in the power cylinder 5 in accordance with a vehicle speed. That is, when the vehicle runs at a low speed or at a standstill, relatively high assisting force is produced by the power cylinder 5 for setting the driver a relatively light steering job, and when the vehicle runs at a high speed, relatively low assisting force is produced by the power cylinder 5 for setting the driver a relatively heavy steering job.

The fluid line 10 has a point E from which a fluid line extends a chattering protection seal 16 to supply the seal 16 with a hydraulic pressure.

With the above-mentioned arrangement, the hydraulic pressure applied to the chattering protection seal 16 depends on the assisting force produced by the power cylinder 5.

FIG. 7 shows a sectional view of a power steering device.

In the drawing, denoted by numeral 41 is a hydraulic valve which comprises a valve body 34, a valve shaft 33, a torsion bar 35, an inlet port 36, an outlet port 37 and a return port 38. It is to be noted that the illustration (viz., the illustration shown at the upper left portion of FIG. 7) shown in the zone enclosed by a phantom line is a laterally sectional view of the hydraulic valve 41. The detail of this hydraulic valve 41 is described in page 29 of NISSAN's SERVICE MANUAL published 1981.

FIG. 8 is an enlarged view of a portion of the hydraulic valve 41 of FIG. 7.

In FIG. 8, the seal 16 for suppressing the chattering is shown. As shown, the seal 16 is arranged between the valve shaft 33 and the valve body 34 and applied with a hydraulic pressure which is transmitted through a conduit 16a.

With provision of this seal 16, undesired vibration of the hydraulic valve 41, which tends to occur at a deep steering, is suppressed.

However, in the above-mentioned hydraulic valve device, the hydraulic pressure applied to the chattering protection seal 16 is forced to vary as the opening of the variable apertures 1R, 1L, 2R and 2L changes, that is, when the steering torque changes.

When the hydraulic pressure to the chattering protection seal 16 changes, the slide torque of the hydraulic valve 41 (that is, the friction between the valve shaft 33 and the valve body 34) is varied. This will be seen from the graph of FIG. 5.

Accordingly, in the above-mentioned valve device, the slide torque of the hydraulic valve 41 is varied in response to turning of the steering wheel even when the vehicle is under a high or middle speed movement. This gives uncomfortable steering feeling to the driver.

SUMMARY OF THE INVENTION

It is therefore an object of the present invention to provide a hydraulic valve device for an automotive power steering gear, which is free of the above-mentioned drawback.

According to the present invention, there is provided a hydraulic valve device in which when the vehicle is under a high or middle speed movement, the slide torque of the hydraulic valve is controlled to a relatively low constant level irrespective of the turning of the steering wheel.

According to the present invention, there is provided a power steering device for a motor vehicle, which comprises first means for producing a hydraulic pressure; a power cylinder powered by the hydraulic pressure for producing a force to assist the steering job; a hydraulic valve for controlling the hydraulic pressure supplied to the power cylinder, the hydraulic valve including a valve shaft and a valve body; a chattering protection seal associated with the hydraulic valve to assure a concentric rotation of the valve shaft relative to the valve body with an assistance of hydraulic pressure applied thereto; and second means for applying, when the vehicle is at a standstill or under a low speed movement, the chattering protection seal with a hydraulic pressure which is varied as a steering wheel is turned, and applying, when the vehicle is under a high or middle speed movement, the chattering protection seal with a hydraulic pressure which is controlled to a relatively low constant level even when the steering wheel is turned.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
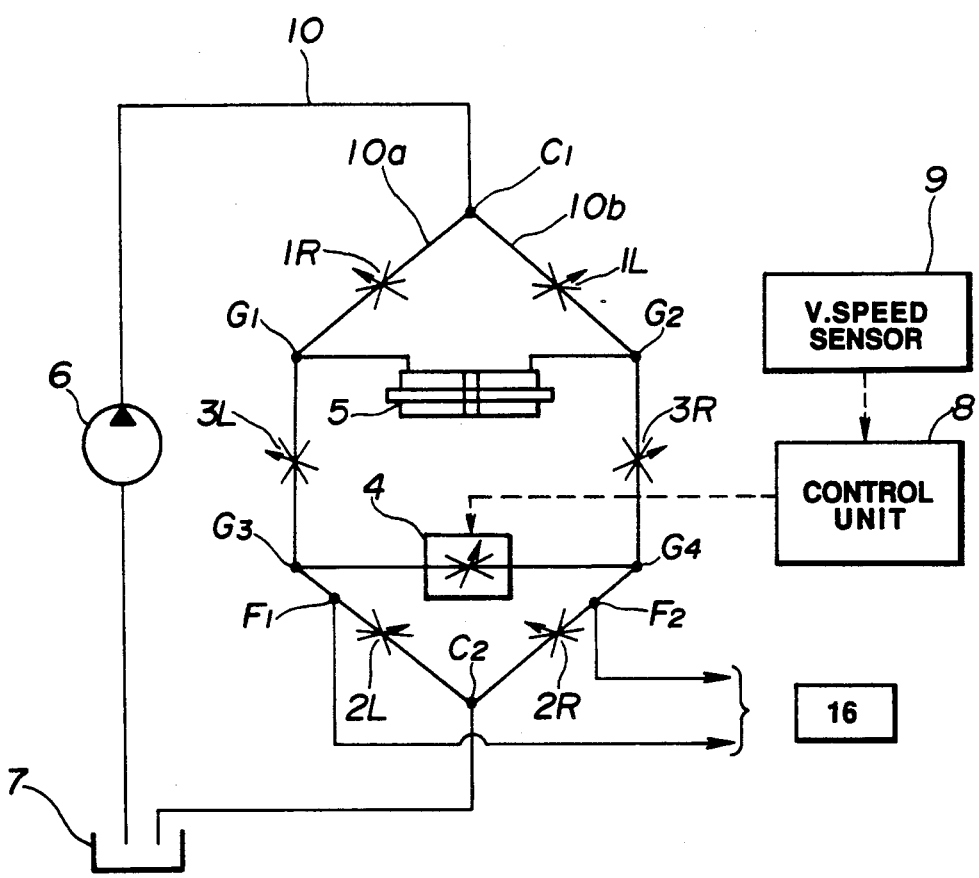
FIG. 1 is a hydraulic circuit of a hydraulic valve device of a first embodiment of the present invention.
Figure 2A:
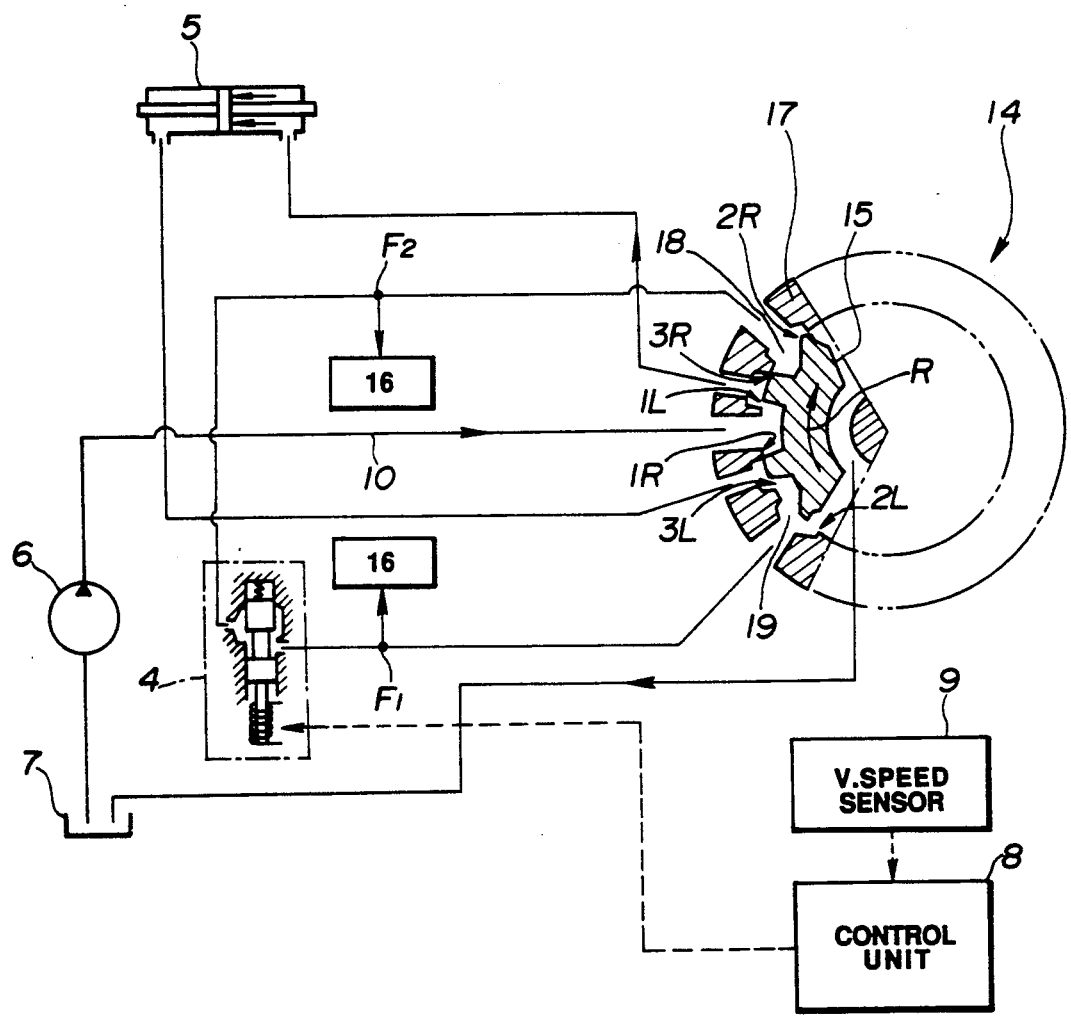
FIG. 2A is a hydraulic circuit of the first embodiment with some parts of a hydraulic valve concretely illustrated.
Figure 2B:
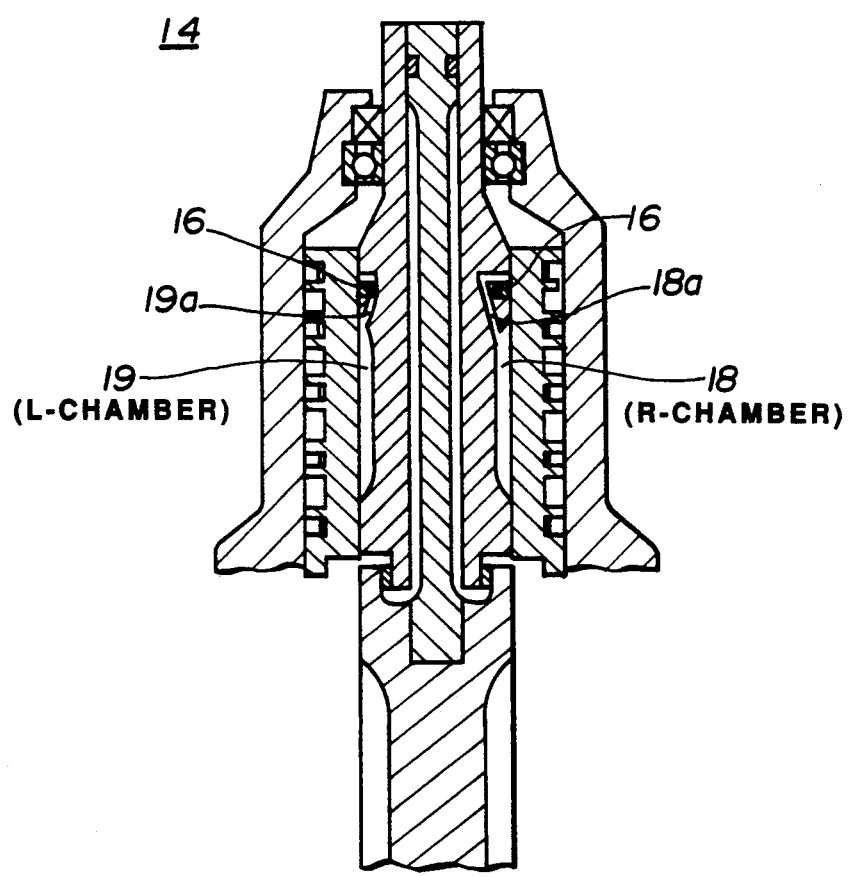
FIG. 2B is a vertically sectional view of the hydraulic valve.
Figure 6:
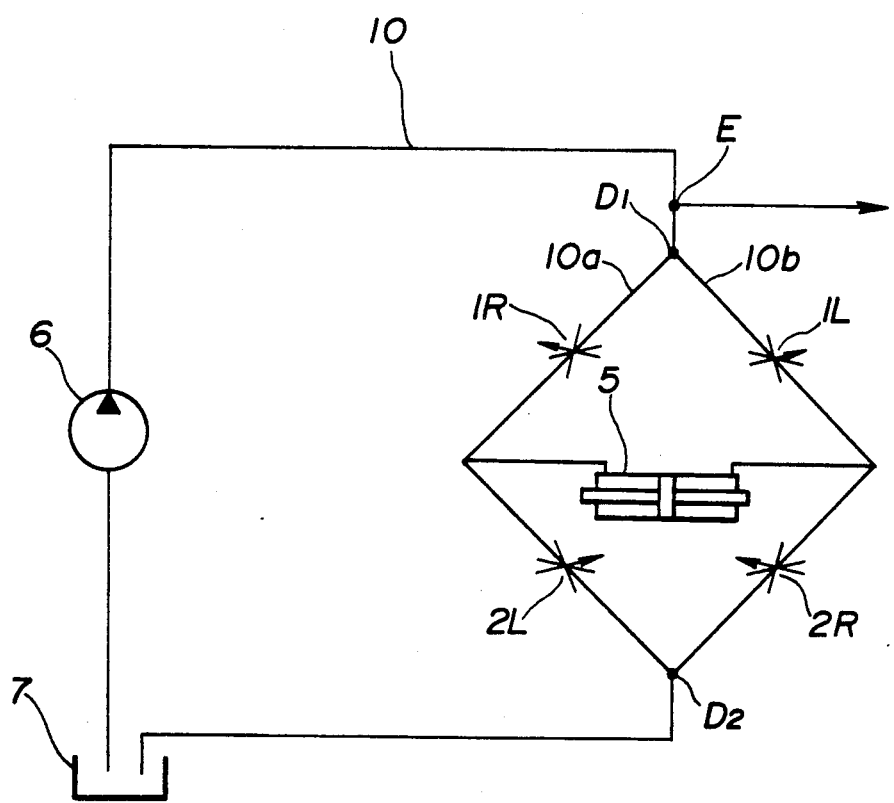
FIG. 6 is a view similar to FIG. 1, but showing a conventional hydraulic valve device.
Figure 7:
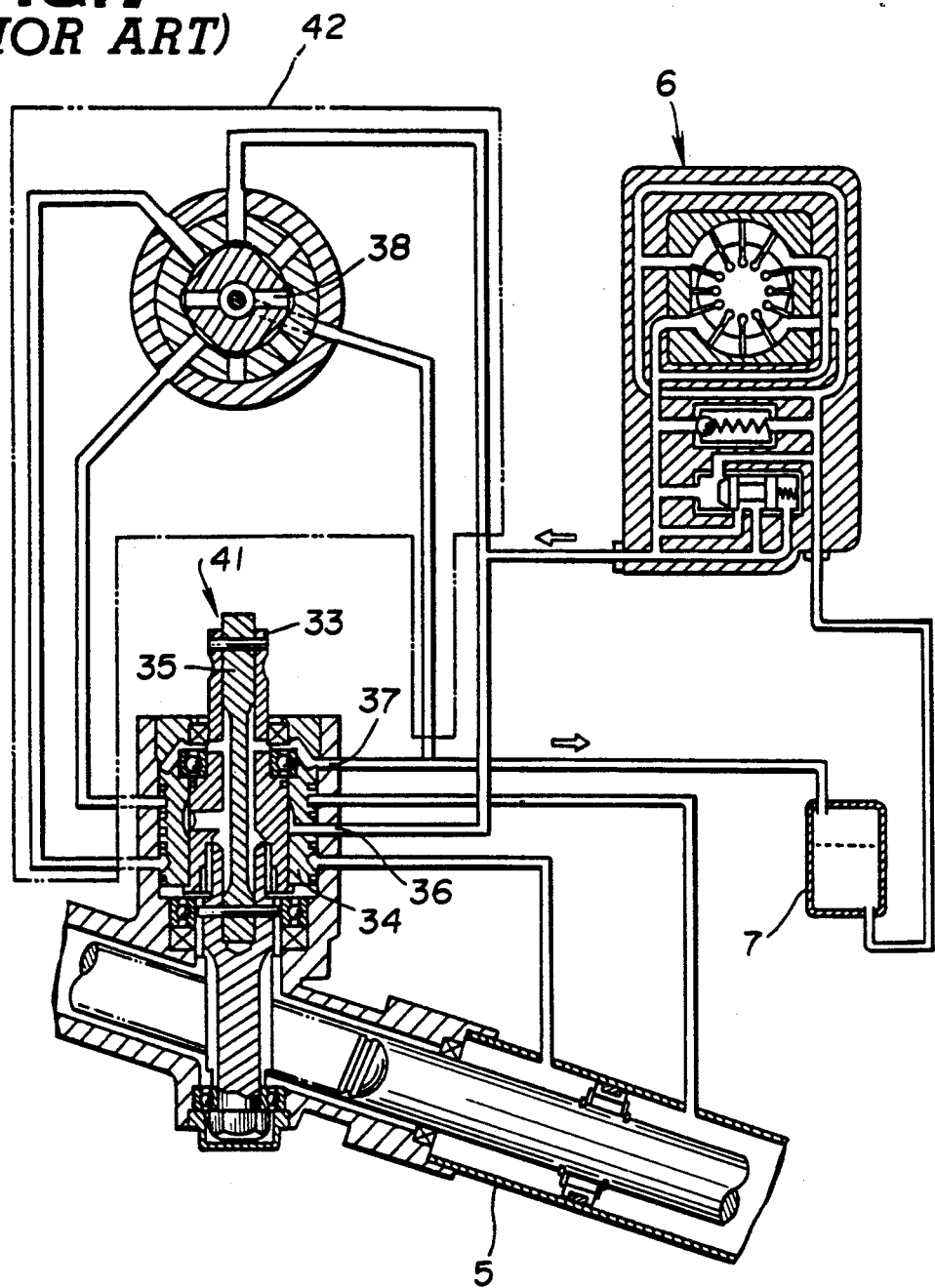
FIG. 7 is a hydraulic circuit of the conventional hydraulic valve device with some parts concretely illustrated.
Figure 8:
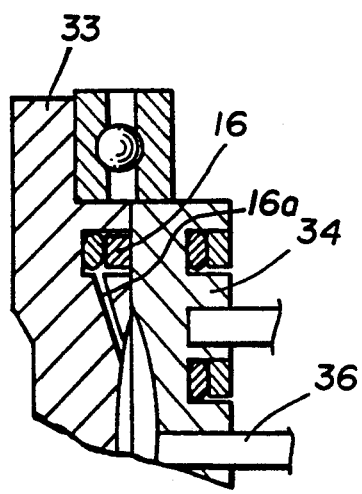
FIG. 8 is an enlarged view of a part of a hydraulic valve shown in FIG. 7.

Referring to FIGS. 1, 2A and 2B, there is shown a first embodiment of the present invention. In these drawings, parts identical to those of the conventional hydraulic valve device of FIGS. 6, 7 and 8 are denoted by the same numerals.

In FIG. 1, denoted by numeral 6 is a hydraulic pump from which a fluid line 10 extends to a branch point C1 from which two fluid lines 10a and 10b extend. These two fluid lines 10a and 10b are mated at a junction point C2 from which a fluid return line (no numeral) extends to a reservoir tank 7.

The fluid line 10a has three variable apertures 1R, 3L and 2L mounted thereto in order, and the other fluid line 10b has three variable apertures 1L, 3R and 2R mounted thereto in order.

The variable apertures 1R, 3R and 2R are of a type which decreases the opening (that is, increases the throttling degree) when the steering wheel is turned to the right, and the variable apertures 3L, 2L and 1L are of a type which decreases the opening (that is, increases the throttling degree) when the steering wheel is turned to the left. Thus, hereinafter, the variable apertures 1R, 3R and 2R will be called as "right turning variable aperture" and the variable apertures 3L, 2L and 1L will be called as "left turning variable aperture".

These variable apertures 1R, 1L, 2R, 2L, 3R and 3L are all formed in a hydraulic valve 14 which is shown in FIG. 2B.

It is to be noted that the variable apertures 1R, 1L, 2R and 2L are of a low speed exclusive type which can close the opening with a low steering torque and the variable apertures 3R and 3L are of a high speed exclusive type which can close the opening with a high steering torque.

A power cylinder 5 is incorporated with the two fluid lines 10a and 10b, which has one I/O opening connected to an intermediate point G1 between the variable apertures 1R and 3L and the other I/O opening connected to an intermediate point G2 between the variable apertures 1L and 3R.

A solenoid valve 4 is incorporated with the two fluid lines 10a and 10b, which has one I/O opening connected to an intermediate point G3 between the left turning variable apertures 3L and 2L and the other I/O opening connected to an intermediate point G4 between the right turning variable apertures 3R and 2R.

Between the point G3 and the left turning variable aperture 2L and between the point G4 and the right turning variable aperture 2R, there are arranged fluid supply points F1 and F2 respectively from which respective fluid lines (no numerals) are led to a chattering protection seal 16 of the hydraulic valve 14.

Denoted by numerals 9 and 8 in FIG. 1 are a vehicle speed sensor and a control unit. In accordance with an information signal produced by the vehicle speed sensor 9, the control unit 8 controls the opening of the solenoid valve 4 in a manner which will be clarified from the following description.

In the following the operation carried out when, with the vehicle being at a standstill, the steering wheel is turned to the right turning the valve shaft 15 (see FIG. 2A) in the direction of the arrow R will be described with reference to FIGS. 1, 2A and 2B.

Under the standstill of the vehicle, the vehicle speed sensor produces a signal which represents that the vehicle speed is zero, and thus, the control unit 8, judging that the vehicle is at a standstill, closes the solenoid valve 4.

Due to rotation of the valve body 17 in the direction of the arrow R caused by the rightward turning of the steering wheel, the right turning variable apertures 1R, 2R and 3R decrease their opening and the left turning variable apertures 1L, 2L and 3L increase their opening.

Because the right turning variable aperture 1R is throttled, the operation fluid supplied from the hydraulic pump 6 through the fluid line 10 is forced to flow through the left turning variable aperture 1L to one work chamber (that is, the right work chamber in FIG. 1) of the power cylinder 5. With this, the steering job for moving the steering wheel to the right is assisted.

The operation fluid from the variable aperture 1L is further supplied through the throttled variable aperture 3R and the fluid supply point F2 to an R-chamber 18 of the hydraulic valve 14.

That is, as is seen from FIG. 2A, the R-chamber 18 is communicated with the fluid supply point F2, and thus the operation fluid is supplied from the point F2 to the chattering protection seal 16 which is arranged at an upper part of the R-chamber 18 as is shown in FIG. 2B.

Since, under this condition, the solenoid valve 4 is kept closed, one part of the operation fluid from the throttled variable aperture 3R is fed to the above-mentioned seal 16, and the other part of the fluid is returned through the throttled variable aperture 2R and an outlet port (not shown) of the hydraulic valve 14 to the reservoir tank 7.

Accordingly, the pressure of the fluid supplied from the point F2 to the chattering protection seal 16 is varied in accordance with the throttling degree of the variable aperture 2R, that is, in accordance with the steering torque. With this, the undesirable vibration of the hydraulic valve 14 at the standstill of the vehicle is suppressed or at least minimized.

In the following, operation carried out when, with the vehicle running at a high or middle speed, the steering wheel is turned to the right turning the valve shaft 15 (see FIG. 2A) in the direction of the arrow R will be described.

Under the high or middle speed movement of the vehicle, receiving a vehicle speed representing signal from the vehicle speed sensor 9, the control unit 8 fully opens the solenoid valve 4.

Due to the rightward rotation of the steering wheel, the right turning variable apertures 1R, 2R and 3R decrease their opening and the left turning variable apertures 1L, 2L and 3L increase their opening.

Accordingly, the operation fluid supplied from the hydraulic pump 6 through the fluid line 10 is forced to flow through the variable aperture 1L to one work chamber of the power cylinder 5, like in the above-mentioned standstill case. With this, the steering job for moving the steering wheel to the right is assisted.

Since, under this condition, the solenoid valve 4 is kept fully opened, the operation fluid from the throttled variable aperture 3R is fed to the chattering protection seal 16 through two lines, one being a first line including the point G4 (see FIG. 1) and the point F2, and the other being a second line including the point G4, the opened solenoid valve 4, the point G3 and the point F1. The first line leads to the R-chamber 18 and the second line leads to the L-chamber 19, as is shown in FIG. 2B. The operation fluid supplied to the L-chamber 19 from the point F1 is returned to the reservoir tank 7 through the left turning variable aperture 2L and the outlet port (not shown) of the hydraulic valve 14.

Under this condition, the hydraulic pressure in the work chamber of the power cylinder 5 depends on only the pressure produced by the right turning variable aperture 3R. Thus, the steering assisting force produced by the power cylinder 5 is somewhat lowered. As known, the lowered assisting force is appropriate for steering the vehicle at a high or middle speed.

As is described hereinabove, under a high or middle speed movement of the vehicle, the operation fluid is supplied to the chattering protection seal 16 from both the points F1 and F2. Due to this two-way fluid supply, the hydraulic pressure applied to the chattering protection seal 16 shows a relatively low constant level irrespective of the throttling degrees of the right turning variable apertures 1R, 2R and 3R, that is, irrespective of the steering torque.

Accordingly, under high or middle speed cruising, changing of steering torque has no effect on the friction between the valve shaft 15 and the valve body 17, and thus, comfortable steering feeling is obtained.

Although the hydraulic valve 14 shown in FIG. 2A illustrates only one valve unit which includes the variable apertures 1R, 1L, 2R, 2L, 3R and 3L, the R-chamber 18 and the L-chamber 19, the hydraulic valve 14 has in fact three identical valve units therearound in order to assure a concentric rotation of the valve shaft 15 within the valve body 17. The R-chamber (or L-chamber) of one valve unit is located beside the L-chamber (or R-chamber) of the other valve unit. Accordingly, it may occur that the neighboring R- and L-chambers of the neighboring valve units become fluidly communicated through a clearance which is produced above or below the seal 16. This fluid communication makes the concentric rotation of the valve shaft 15 relative to the valve body 17 very poor.

In order to solve this drawback, the following measure is applied to the hydraulic valve 14.

That is, as is shown in FIG. 2B, each R-chamber 18 has a conduit 18a which extends to an upper surface of the seal 16, and each L-chamber 19 has a conduit 19a which extends to a lower surface of the seal 16. With this, the hydraulic pressure from each R-chamber 18 is applied to the upper surface of the seal 16, and the hydraulic pressure from each L-chamber 19 is applied to the lower surface of the seal 16.

With this arrangement, mutual isolation of the R-and L-chambers 18 and 19 is assured. That is, due to such arrangement, the operation fluid in the R-chamber (or L-chamber) is prevented from entering the L-chamber (or R-chamber). Thus, the concentric rotation of the valve shaft 15 relative to the valve body 17 is assured.

Figure 4:
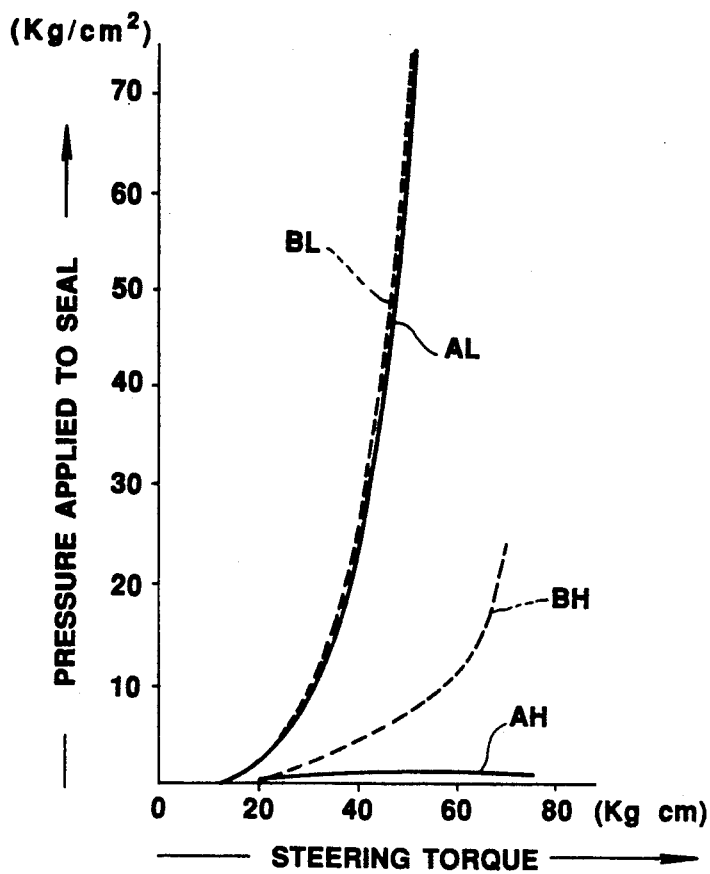
FIG. 4 is a graph showing a relationship between a steering torque and a hydraulic pressure applied to a chattering protection seal.
Figure 5:
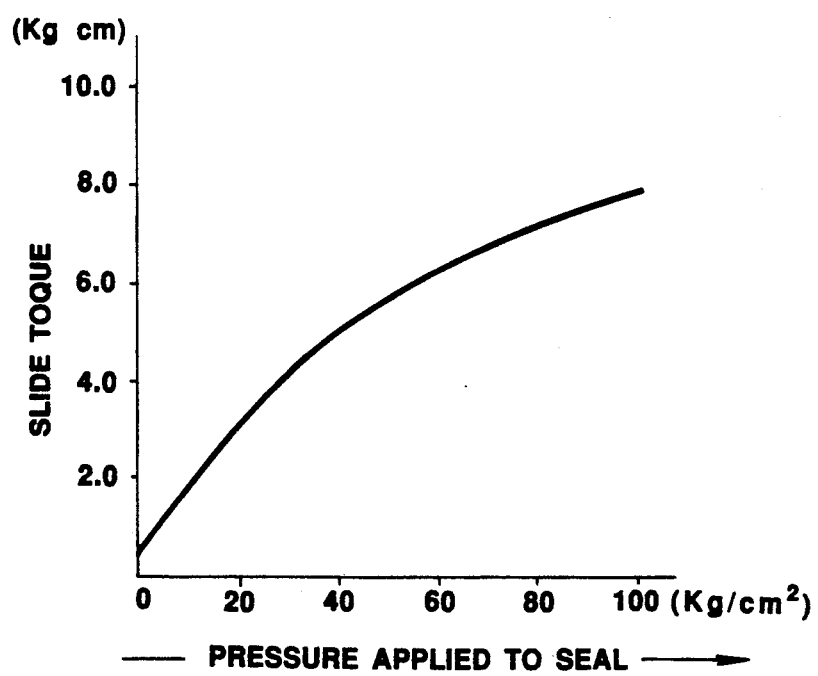
FIG. 5 is a graph showing a relationship between the hydraulic pressure and a slide torque.

FIG. 4 is a graph showing the relationship between a steering torque produced when the steering wheel is turned and a hydraulic pressure applied to the chattering protection seal 16. Solid lines AL and AH show characteristics of the invention of FIG. 1 obtained when the vehicle is at a standstill and under a high or middle speed cruising, respectively, while dashed lines BL and BH show characteristics of a conventional device obtained when the vehicle is at a standstill and under a high or middle speed cruising. As is understood from the lines AL and BL of the graph, when the vehicle is at a standstill, the invention and the conventional device show substantially the same characteristics. That is, the hydraulic pressure applied to the chattering protection seal 16 is increased with increase of the steering torque. While, as is understood from the lines AH and BH, when the vehicle is under a high or middle speed cruising, the invention and the conventional device show different characteristics. That is, in the conventional device, the hydraulic pressure applied to the seal 16 is increased with increase of the steering torque, while, in the invention, such pressure is controlled to a relatively low constant level even when the steering torque is increased.

Figure 3:
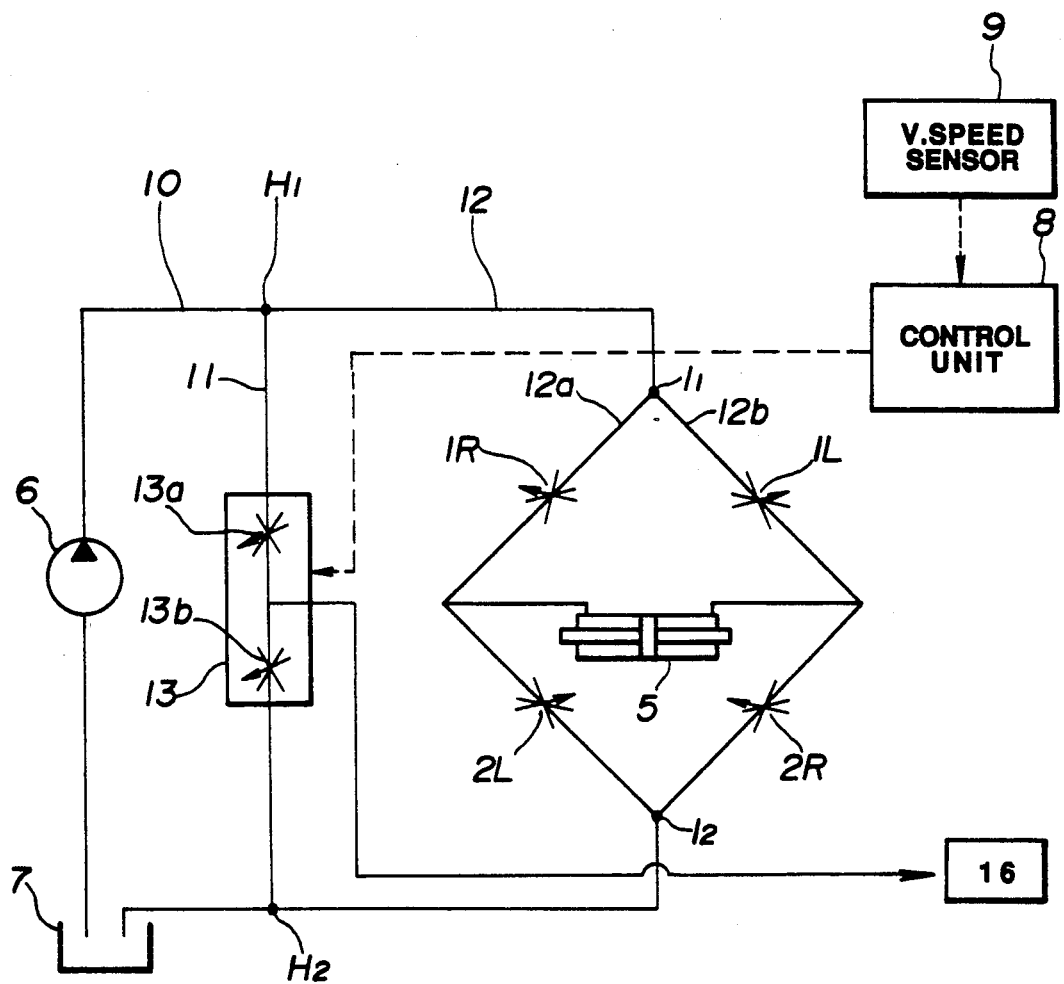
FIG. 3 is a view similar to FIG. 1, but showing a second embodiment of the present invention.

Referring to FIG. 3 of the drawings, there is shown a second embodiment of the present invention. In the drawings, parts identical to those in the first embodiment of FIG. 1 are denoted by the same numerals.

As is seen from FIG. 3, a liquid line 10 extending from a hydraulic pump 6 has a branch point H1 from which two fluid lines 11 and 12 extend. The fluid line 12 has a branch point I1 from which two fluid lines 12a and 12b extend. These two fluid lines 12a and 12b are mated at a junction point I2. The fluid line 12a has two variable apertures 1R and 2L mounted thereto, and the fluid line 12b has two variable apertures 1L and 2R mounted thereto. These variable apertures 1R, 1L, 2R and 2L are formed in a hydraulic valve in the same manner as the hydraulic valve 14 shown in FIG. 7. The variable apertures 1R and 2R are of a type which decreases the opening (that is, increases the throttling degree) when the steering wheel of the vehicle is turned to the right, and the other variable apertures 1L and 2L are of a type which decreases the opening (that is, increases the throttling degree) when the steering wheel is turned to the left.

A power cylinder 5 is incorporated with the the fluid lines 12a and 12b, which has one I/O opening connected to an intermediate point between the variable apertures 1R and 2L and the other I/O opening connected to an intermediate point between the variable apertures 1L and 2R.

The fluid line 11 leads to a junction point H2 formed on the fluid return line which extends from the junction point I2 to the reservoir tank 7.

A solenoid valve 13 is mounted to the fluid line 11, which includes first and second valve units 13a and 13b controlled by the control unit 8. The solenoid valve 13 has between the two valve units 13a and 13b an outlet port from which a fluid line extends to a chattering protection seal 16 of the hydraulic valve.

Under a standstill of the vehicle, the control unit 8 closes the valve unit 13a and opens the valve unit 13b of the solenoid valve 13.

When, under this standstill condition, the steering wheel is turned to the right, the right turning variable apertures 1R and 2R decrease their opening and the left turning variable apertures 1L and 2L increase their opening in accordance with the steering torque.

Because the right turning variable aperture 2R is throttled, the operation fluid supplied from the hydraulic pump 6 through the fluid line 10 is forced to flow through the left turning variable aperture 1L to one work chamber of the power cylinder 5. With this, the steering job for moving the steering wheel to the right is assisted.

The operation fluid from the variable aperture 1L is further supplied through the throttled variable aperture 2R, the junction point I2, the point H2, the opened valve unit 13b of the solenoid valve 13 to the chattering protection seal 16.

More specifically, under this standstill condition, one part of the fluid from the junction point I2 is fed to the seal 16 and the other part of the same is returned to the reservoir tank 7.

Accordingly, the pressure of the fluid supplied to the seal 16 is varied in accordance with the throttling degree of the variable aperture 2R, that is, in accordance with the steering torque. With this, undesirable vibration of the hydraulic valve 14 at the standstill of the vehicle is suppressed or at least minimized.

Under a high or middle speed movement of the vehicle, the control unit 8 opens both the valve units 13a and 13b of the hydraulic valve 13.

When, under this high or middle speed movement of the vehicle, the steering wheel is turned to the right, the right turning variable apertures 1R and 2R decrease their opening and the left turning variable apertures 1L and 2L increase their opening in accordance with the steering torque.

Accordingly, the operation fluid from the hydraulic pump 6 is supplied to one work chamber of the power cylinder 5 through the opened variable aperture 1L, like in the above-mentioned standstill case. Thus, the steering job for moving the steering wheel to the right is assisted.

However, since, under this high or middle speed movement of the vehicle, the solenoid valve 13 is fully opened constituting a so-called "bypass passage" for the two fluid lines 12a and 12b, the hydraulic pressure supplied to the power cylinder 5 is controlled to a relatively low level.

Furthermore, since the hydraulic pressure applied to the chattering protection seal 16 is fed from the "bypass passage", the pressure shows a relatively low constant level irrespective of the throttling degrees of the right turning variable apertures 1R and 2R, that is, irrespective of the steering torque.

Accordingly, under high or middle speed movement of the vehicle, changing of the steering torque has no effect on the friction between the valve shaft 15 and the valve body 17, and thus, comfortable steering feeling is given to a driver.

Thus, the second embodiment shows substantially the same characteristic as the first embodiment.

As will be understood from the foregoing description, in the hydraulic valve device for automotive power steering gear, the following unique features are obtained.

First, when the vehicle is at a standstill or under a low speed movement, the hydraulic pressure applied to the chattering protection seal is varied in accordance with the steering torque. With this, undesirable vibration of the hydraulic valve, which tends to occur when the steering wheel is subjected to a deep turning, is suppressed or at least minimized.

Second, when the vehicle is under a high or middle speed movement, the hydraulic pressure applied to the chattering protection seal is controlled to a relatively low constant level irrespective of the steering torque. With this, comfortable steering feeling is given to the driver.

What is claimed is:

1. A power steering device for a motor vehicle, comprising:
   first means for producing a hydraulic pressure;
   a power cylinder powered by said hydraulic pressure for producing a force to assist a steering job applied to the motor vehicle;
   a hydraulic valve for controlling the hydraulic pressure supplied to said power cylinder, said hydraulic valve including a valve shaft and a valve body;
   a chattering protection seal associated with said hydraulic valve to assure a concentric rotation of said valve shaft relative to said valve body with an assistance of hydraulic pressure applied thereto; and
   second means for applying, when the vehicle is at a standstill or under a low speed movement, said chattering protection seal with a hydraulic pressure which is varied as a steering wheel is turned, and applying, when the vehicle is under a high or middle speed movement, said chattering protection seal with a hydraulic pressure which is controlled to a relatively low constant level even when the steering wheel is turned.

2. A power steering device as claimed in claim 1, in which said second means comprises:
   a solenoid valve which, when opened, has an operation fluid passed therethrough thereby to decrease the hydraulic pressure applied to said chattering protection seal; and
   control means for opening said solenoid valve when the vehicle is under the high or middle speed movement.

3. A power steering device as claimed in claim 2, in which said control means comprises:
   a vehicle speed sensor for issuing an information signal representative of the vehicle speed; and
   judging means for judging, by analyzing said information signal from said vehicle speed sensor, whether the vehicle is (1) at the standstill, (2) under the low speed movement, or (3) under the high or middle speed movement.

4. A power steering device as claimed in claim 3, in which said solenoid valve has therein first and second fluid lines which have upstream ends mated at a branch point and downstream ends mated at a junction point, said branch point being a point to which the hydraulic pressure produced by said first means is supplied.

5. A power steering device as claimed in claim 4, in which said first fluid line has a first right turning variable aperture, a third left turning variable aperture and a second left turning variable aperture mounted thereto in order from said branch point to said junction point, and in which said second fluid line has a first left turning variable aperture, a third right turning variable aperture and a second right turning variable aperture mounted thereto in order from said branch point to said junction point, the right turning variable apertures being of a type which decreases the opening when the steering wheel is turned to the right, and the left turning variable apertures being of a type which decreases the opening when the steering wheel is turned to the left.

6. A power steering device as claimed in claim 5, in which said power cylinder is incorporated with said first and second fluid lines, said power cylinder having one Input/Output opening connected to an intermediate point between said first right turning variable aperture and said third left turning variable aperture and the other Input/Output opening connected to an intermediate point between said first left turning variable aperture and said third right turning variable aperture.

7. A power steering device as claimed in claim 6, in which said solenoid valve is incorporated with said first and second fluid lines, said solenoid valve having one Input/Output opening connected to an intermediate point between said third left turning variable aperture and said second left turning variable aperture and the other Input/Output opening connected to an intermediate point between said third right turning variable aperture and said second right turning variable aperture.

8. A power steering device as claimed in claim 7, in which said first fluid line has at a point just upstream of said second left turning variable aperture a first fluid supply point from which the hydraulic pressure is applied to said chattering protection seal, and in which said second fluid line has at a point just upstream of said second right turning variable aperture a second fluid supply point from which the hydraulic pressure is applied to said chattering protection seal.

9. A power steering device as claimed in claim 8, in which said chattering protection seal has a first pressure applied surface to which the hydraulic pressure from said first fluid supply point is applied and a second pressure applied surface to which the hydraulic pressure from said second fluid supply point is applied.

10. A power steering device as claimed in claim 9, in which said first means comprises:
 a reservoir tank for reserving an operation fluid;
 a hydraulic pump for transferring the fluid from said reservoir tank to said branch point of said first and second fluid lines; and
 a fluid return line for returning the operation fluid from said junction point to said reservoir tank.

11. A power steering device as claimed in claim 4, in which said first fluid line has a first right turning variable aperture and a second left turning variable aperture mounted thereto in order from said branch point to said junction point, and in which said second fluid line has a first left turning variable aperture and a second right turning variable aperture mounted thereto in order from said branch point to said junction point, the right turning variable apertures being of a type which decreases the opening when the steering wheel is turned to the right, and the left turning variable apertures being of a type which decreases the opening when the steering wheel is turned to the left.

12. A power steering device as claimed in claim 11, in which said power cylinder is incorporated with said first and second fluid lines, said power cylinder having one Input/Output opening connected to an intermediate point between said first right turning variable aperture and said second left turning variable aperture and the other Input/Output opening connected to an intermediate point between said first left turning variable aperture and said second right turning variable aperture.

13. A power steering device as claimed in claim 12, in which said solenoid valve has a first Input/Output opening connected to said branch point of said first and second fluid lines and a second Input/Output opening connected to said junction point of said first and second fluid lines.

14. A power steering device as claimed in claim 13, in which said solenoid valve comprises first and second valve units which are connected in series and positioned near said first and second Input/Output openings respectively.

15. A power steering device as claimed in claim 14, in which said first and second valve units are opened by said control means when the vehicle is under the high or middle speed movement, and at least said first valve unit is closed when the vehicle is at a standstill or under a low speed movement.

16. A power steering device as claimed in claim 15, in which said solenoid valve has between said first and second valve units an outlet opening from which the hydraulic pressure is applied to said chattering protection seal.

17. A power steering device as claimed in claim 16, in which said first means comprises:
 a reservoir tank for reserving an operation fluid;
 a hydraulic pump for transferring the fluid from said reservoir tank to said branch point of said first and second fluid lines; and
 a fluid return line for returning the operation fluid from said junction point to said reservoir tank.

* * * * *